United States Patent [19]

Ducret

[11] Patent Number: 4,504,852
[45] Date of Patent: Mar. 12, 1985

[54] METHOD AND APPARATUS FOR VIDEO STANDARD CONVERSION

[75] Inventor: Robert P. Ducret, Los Angeles, Calif.

[73] Assignee: Beehler, Pavitt, Siegemund, Jagger & Martella, Los Angeles, Calif.

[21] Appl. No.: 416,501

[22] Filed: Sep. 10, 1982

[51] Int. Cl.³ .............................................. H04N 5/02
[52] U.S. Cl. ...................................... 358/11; 358/12; 358/140
[58] Field of Search .................. 358/11, 12, 140, 3, 358/14, 141; 360/22; 375/38; 455/59

[56] References Cited

U.S. PATENT DOCUMENTS

| | | | |
|---|---|---|---|
| 1,812,405 | 6/1931 | Ives | 358/12 |
| 3,412,218 | 11/1968 | Comerci | 360/22 |
| 4,188,638 | 2/1980 | de Haan | 358/11 |

Primary Examiner—Michael A. Masinick
Attorney, Agent, or Firm—Beehler, Pavitt, Siegemund, Jagger & Martella

[57] ABSTRACT

A video signal having a given line scan rate is converted to a different line scan rate by analog encoding such that each scan line is divided into a finite number of picture elements and video information corresponding to each picture element is modulated onto one of a series of carrier frequencies for transmission in parallel form. An inexpensive decoder scans the encoded video signal to reconstruct an output video signal having a line scan rate related to the rate of repetition of the encoded video signal scanning cycle.

52 Claims, 19 Drawing Figures

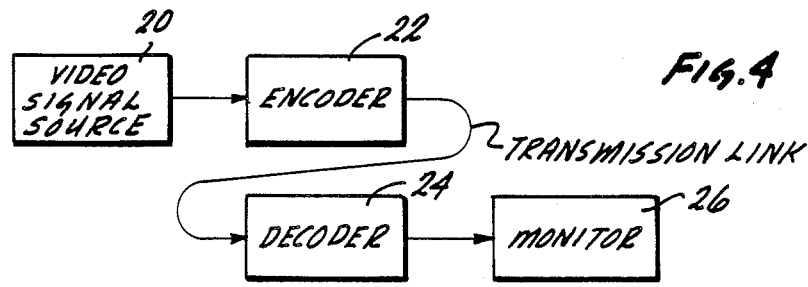
FIG.4
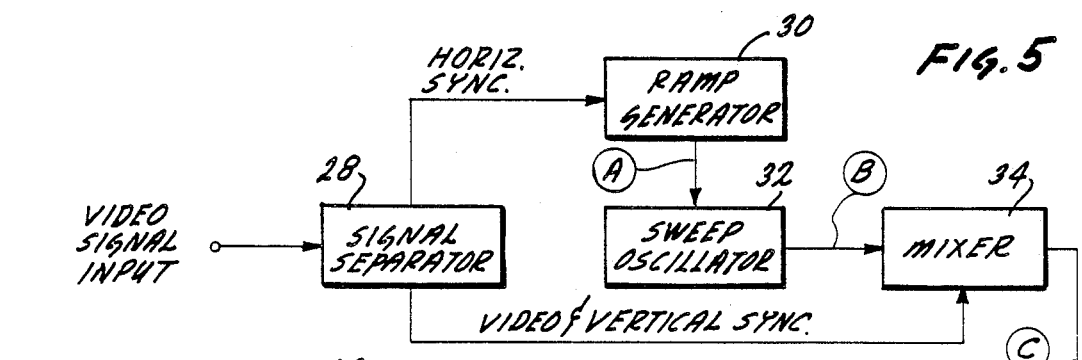
FIG.5
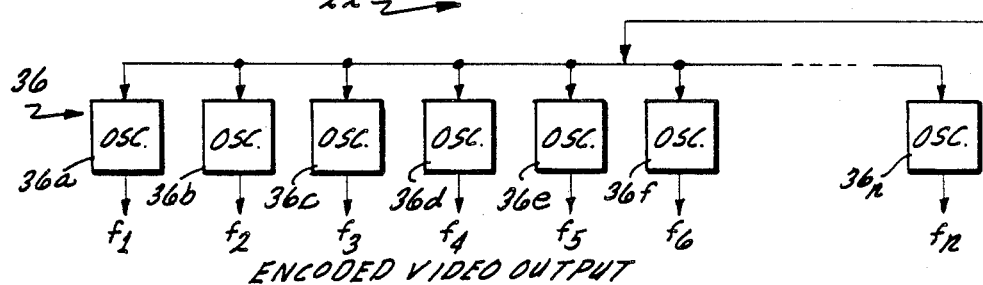
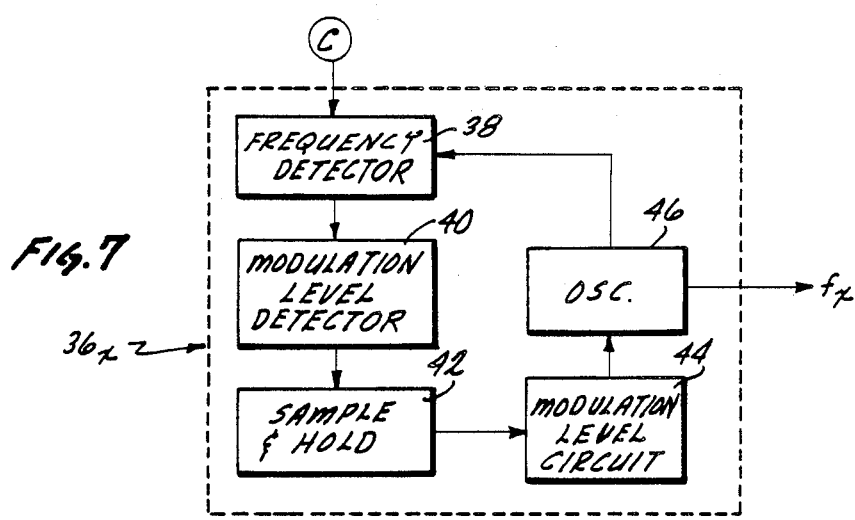
FIG.7

METHOD AND APPARATUS FOR VIDEO STANDARD CONVERSION

BACKGROUND OF THE INVENTION

1. Field of the Invention

The present invention relates generally to the field of video communications and is more particularly directed to a method and apparatus for conversion of a video signal from a first standard to a second standard.

2. State of the Prior Art

The problem of converting a video signal from one television standard to a different television standard, where the two standards differ in the number of scan lines per frame and/or in the field frequency has been addressed by a number of patents.

U.S. Pat. No. 4,283,736 issued to Morio et al on Aug. 11, 1981 discloses apparatus for converting both the field frequency and the scan line rate of a video signal. U.S. Pat. No. 4,276,565 issued to Dalton et al on June 30, 1981 also discloses a method and apparatus for standard conversion of television signals wherein conversion to either a higher or lower number of scan lines is possible. U.S. Pat. No. 4,240,101 issued Dec. 16, 1980 to Michael et al also teaches television standards conversion. Also known to the applicant, are U.S. Pat. Nos. 3,073,896 to James issued Jan. 15, 1963, U.S. Pat. No. 3,925,606 to Wood et al issued Dec. 9, 1975, and U.S. Pat. No. 3,917,906 to Johnson et al issued Nov. 4, 1975. The James reference teaches a digital conversion system for converting video signals from one format to another and further achieves a reduction in the bandwidth necessary to transmit the video information. Johnson et al discloses a system for multiplexing multiple information channels adjacent to the video spectrum on a television, microwave or cable unit so as to enable the transmission of additional information by modulation of subcarrier frequencies. Wood et al teaches a system for television display of periodic signals such as sonar returns for display on a conventional television monitor.

The approach taken by the above references to the problem of conversion of video signals from one scan line and field rate standard to a different standard has been uniformly based on digital techniques requiring digital storage devices and leading to costly and complex encoder-decoder systems.

The present trend in the video industry is towards higher resolution video imaging and development of high definition television (HDTV) systems. Proposed HDTV systems have an image format of 1,125 horizontal scanning lines, a bandwidth of 30 Megahertz, 30 frames per second, and an aspect ratio of 3 to 5 or 3 to 6.

Presently used home television receiving sets constructed for the American NTSC video standard are limited to an image format of 525 scanning lines, a 4.2 Megahertz bandwidth, 30 frames per second and a 3 to 4 aspect ratio. The existence and prospective widespread commercial use of such high definition television systems raises the problem of incompatability between the high definition signals and the capabilities of existing television receiving and video recording equipment in use today.

A need, therefore, exists for a line standard conversion system and particularly for one that makes possible a simple, inexpensive decoder which can be mass produced and distributed at low cost to the viewing public for use with existing video recording and receiving equipment. This need has not been met by presently available systems.

It is also desirable to minimize the signal bandwidth required by the video signals and particularly by high definition video signals, so as to conserve available broadcast frequency spectrum and minimize the bandwidth handling requirements of video equipment. While various bandwidth reduction techniques are known, applicant is not aware of any such methods which are consistent with a low cost decoder.

SUMMARY OF THE INVENTION

The present invention overcomes the shortcomings of the prior art by providing a video standard conversion system based on analog encoding of the video signal. The encoded video signal is decoded by a simple, relatively inexpensive decoder. The encoding process inherently achieves a substantial reduction in video signal bandwidth, and the encoded video signal is suitable for recording, broadcasting or other processing by existing equipment.

According to this invention, an input video signal having a first number of scan lines per frame to be converted to an output video signal having a second number of scan lines per frame is first encoded by simultaneously generating a series of carrier frequencies which constitute a broadband video signal for carrying of the encoded video signal.

Each scan line of the source or input video signal is treated as consisting of a finite number of successive line segments or picture elements (pixels). Each scan line segment is assigned to a particular carrier frequency which is then modulated with video information related to the portion of the input video signal corresponding to the particular scan line segment. The relative position of the particular segment of each scan line assigned to a given carrier frequency preferably does not vary with successive scan lines of the source signal.

The modulation characteristics of each of the carrier frequencies are held constant between successive scan lines and are only refreshed upon the recurrence in each scan line of the particular scan line segment assigned to the particular carrier frequency. In this manner, each entire scan line of the source signal is encoded in parallel form as a series of video signals modulated onto a series of carrier frequencies across the spectrum of the encoded video signal.

The encoded video signal may be decoded by scanning the modulated carrier frequency spectrum comprising the encoded video signal, so as to derive an output video signal comprising video information assembled by sampling in succession the modulation of each scanned carrier frequency, each modulation sample being representative of a scan line segment of the video output signal. The scanning sequence assembles a sequence of successive carrier-frequency modulation samples representative of sucessive scan line segments so as to construct an entire scan line. The scanning cycle is repeated to derive a continuous decoded video signal having a number of scan lines per frame related to the rate of repetition of the scanning cycle.

The encoder constructed according to a presently preferred embodiment of this invention comprises one or more banks of oscillators for generating a series of carrier frequencies, sequential addressing means for allocating a segment of each scan line of the input video signal to each carrier frequency, and modulator circuits for modulating each of the carrier frequencies with video information corresponding to the assigned segment. The modulator circuits are constructed for holding fixed the modulation of each carrier frequency until the particular carrier frequency is again addressed, when the particular scan line portion corresponding to the carrier frequency recurrs in a subsequent scan line of the input video signal.

The encoded video output of the encoder may be decoded by a decoder comprising frequency selective circuits sequentially tunable to particular ones of the carrier frequencies for scanning the encoded video spectrum, so as to derive an output signal modulated with a sequence of video information samples assembled from the scanned carrier frequencies to thereby derive a decoded video output having a number of scan lines determined by the rate at which the scanning sequence is repeated.

BRIEF DESCRIPTION OF THE DRAWINGS

FIG. 4 is a basic block diagram of a video communication system including an encoder and decoder for conversion of the video format.

FIG. 5 is a block diagram of an encoder constructed according to this invention.

FIG. 7 is a block diagram of one oscillator such as are provided in the encoder of FIG. 5 for generating and modulating each carrier frequency.

DETAILED DESCRIPTION OF A PREFERRED EMBODIMENT OF THE INVENTION

Figure 1:
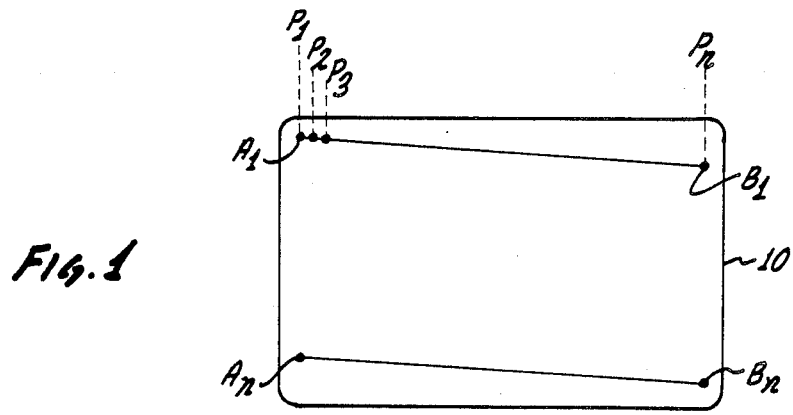
FIG. 1 illustrates typical line scanning from left to right and top to bottom of a video monitor screen in a series of horizontal scan lines.

With reference to the drawings, FIG. 1 shows a typical video monitor screen 10 which is scanned by a scanning spot in a raster pattern from top to bottom and left to right by successive horizontal scan lines AB. Typical video signal wave forms include video information corresponding to each scan line separated by horizontal synchronization information and other information. An input video signal such as the waveform illustrated in FIG. 2a corresponding to a single scan line, e.g., $A_1B_1$ in FIG. 1 may be displayed by modulating the brightness or luminance of the scanning spot as it scans the monitor screen 10 between points $A_1$ and $B_1$.

Figure 2A:
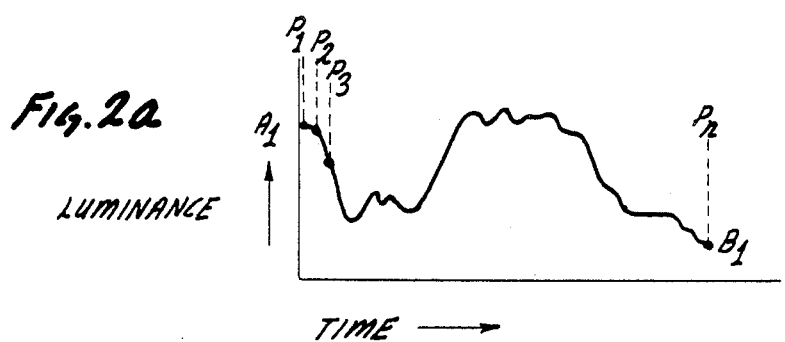
FIG. 2a illustrates a typical wave form representing video information for display as one scan line, as in FIG. 1.

In present video display systems there is a one-to-one relationship in time between the video signal in FIG. 2a and its display as a scan line on the monitor 10 of FIG. 1. Thus, the video signal is transmitted to and received by the monitor in serial manner, i.e., the video information is transmitted in the same sequence as it is displayed along the scan line. Typically, video information is transmitted as an amplitude modulated signal. The amplitude or luminance information is used to vary the intensity of the scanning spot, which may be an electron beam scanning the monitor screen. The amplitude of the video signal is thus merely translated into a corresponding intensity of the electron beam. A complete video image may be formed by displaying a number of horizontal scan lines sufficient to form a field which fills the monitor screen from top to bottom and interlacing two successive fields by known techniques to form one video frame.

According to the method of this invention, each scan line of an input video signal, e.g. a waveform such as shown in FIG. 2a and corresponding to scan line $A_1B_1$ in FIG. 1 is divided into a discrete number of video elements or segments each constituting a picture element (pixel), $P_1, P_2, P_3, \ldots, P_n$, and corresponding to like numbered segments of each scan line as shown for scan line $A_1B_1$ in FIG. 1. The luminance of each scan line segment or pixel displayed on the screen 10 in FIG. 1 is related to the luminance value of the corresponding element of the video signal in FIG. 2a.

A broadband carrier spectrum is generated comprising a series of preferably closely spaced carrier frequencies $f_1, f_2, f_3, \ldots, f_n$. Each pixel along the scan line $A_1B_1$ is assigned to a particular carrier frequency, preferably in a sequence corresponding to the position of the pixel along the scan line.

In the case of color video the video signal will include in addition to luminance, information related to colors such as red and blue, the third color green normally being derived from the given luminance and color information.

Each carrier frequency $f_x$ is modulated with video information related to the input video signal element or pixel corresponding to a particular segment or pixel of the scan line. The individual carrier frequencies may be amplitude, frequency or phase modulated with the video information. The information modulated onto each carrier frequency may include in addition to luminance or brightness, any desired color information, depth information or other information. If desired, several characteristics e.g. luminance, color, depth information, etc., associated with each pixel may be multiplexed onto a single frequency, or the video characteristics for each scan line segment may be distributed in various ways among more than one carrier frequency.

If multiple carrier frequencies are assigned to each scan line segment the frequencies need not be adjacently located in the broad band video spectrum. In a presently preferred embodiment described below, the carrier spectrum includes three frequency bands and three carrier frequencies one from each band are assigned to each scan line segment to separately carry luminance and each of two colors.

In the interest of clarity the invention will be first described in connection with monochrome video signals. However, the present invention extends to the conversion of color video signals and may further include the encoding of video signals carrying depth information for display of three dimensional video images. An encoder-decoder for converting the scan line standard of color video signals is disclosed below.

Figure 2B:
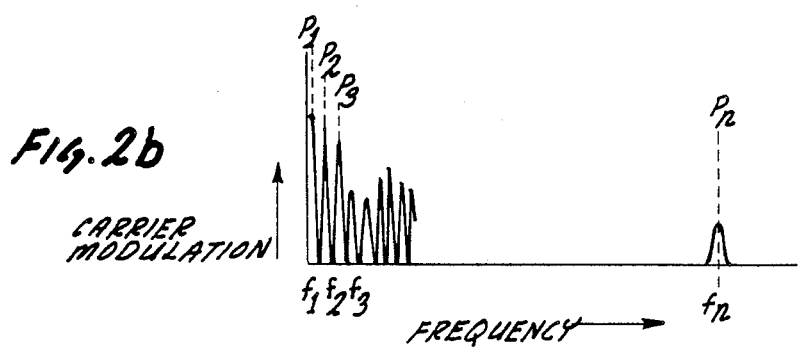
FIG. 2b partially shows a typical spectrum of a broad band video signal encoded according to the present invention.

A typical encoded carrier frequency spectrum in a monochrome embodiment of the invention using only luminance information to modulate the amplitude of the individual carrier frequencies is illustrated in FIG. 2b. The amplitude of each frequency carrier $f_1$-$f_n$ representing particular pixels is seen to correspond to the amplitude of the input video signal at the corresponding pixel in FIG. 2a. The serially transmitted video information comprising a single scan line in FIG. 2a can thus be encoded by the method of the present invention so as to be contained simultaneously in the spectrum of a broad band video signal. The modulation of each carrier frequency is refreshed for successive scan lines of the input video signal.

Figure 3A:
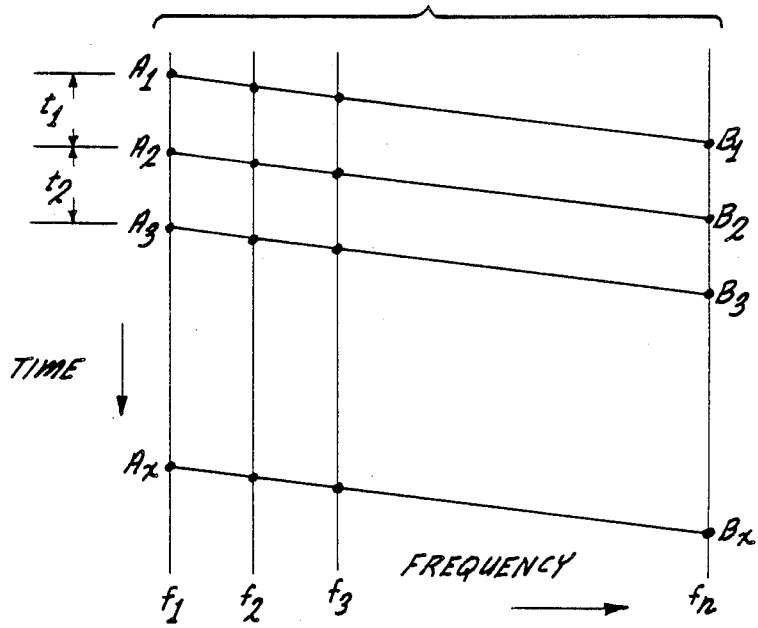
FIG. 3a is a diagram showing the encoding of successive scan lines on a carrier frequency spectrum.

The encoding of the video signal may be better understood by reference to FIG. 3a which illustrates the parallel encoding or modulation of successive scan lines AB on to the carrier frequencies $f_1$ through $f_n$ of the broad band video signal. Thus, as scan line $A_1B_1$ commences with pixel $p_1$, the carrier frequency $f_1$ is modulated with video information such as luminance corresponding to pixel $p_1$ of the input video signal. The modulation characteristics, such as the modulation level or amplitude of carrier frequency $f_1$ is then held fixed during a time interval $t_1$ until new video information pertinent to pixel $p_1$ arrives with the following scan line $A_2B_2$ of the input video signal. Incoming video information pertaining to the next pixel $p_2$ is then modulated on to carrier frequency $f_2$ and the modulation characteristics of this second carrier frequency are also held constant during a time interval $t_1$ until the corresponding segment $p_2$ of the next scan line $A_2B_2$. Video information corresponding to successive pixels of scan line $A_1B_1$ is similarly modulated on to corresponding carrier frequencies and held during a time interval $t_1$. As the encoding of the input video signal proceeds, the last pixel $p_n$ of video information pertaining to scan line $A_1B_1$ is reached and encoded onto the last carrier frequency $f_n$ of the carrier spectrum. At that point in time, the video information pertaining to every pixel of scan line $A_1B_1$, is present in parallel form as information modulated onto corresponding carrier frequencies. This information remains unchanged during the horizontal blanking period, i.e., the time during which the scanning spot returns to the left side of the screen in order to commence scanning of the next scan line $A_2B_2$. New video information pertaining to pixel $p_1$ of the second scan line $A_2B_2$ is then encoded by changing the information modulated onto carrier frequency $f_1$ and holding the refreshed modulated information constant again until the occurrence of pixel $p_1$ for the next scan line $A_3B_3$. It will be apparent that as the beginning of scan line $A_2B_2$ is being encoded onto the carrier spectrum, the higher numbered carrier frequencies still retain the information pertaining to the preceding scan line $A_1B_1$. The updating of the modulated information on successive carrier frequencies proceeds as corresponding pixel video information becomes available.

Figure 2C:
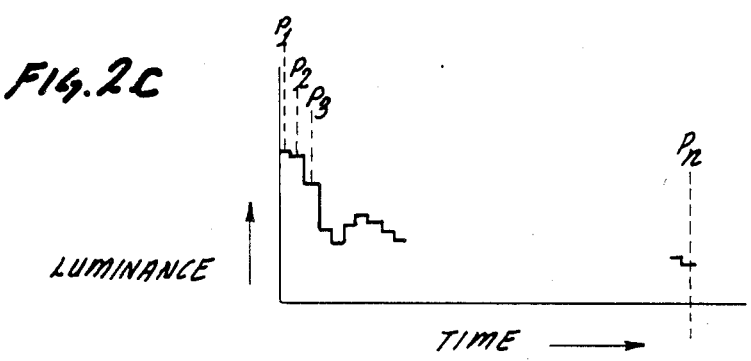
FIG. 2c partially illustrates a typical video signal decoded from the video signal of FIG. 2b.

The encoded video information may be recovered by means of a simple decoding device which is tunable across the individual carrier frequencies of the broad band video carrier signal in order to successively sample the individual carrier frequencies at a rate related to the desired number of scan lines. The scanning process assembles successive samples of video information derived from the carrier frequencies scanned and in effect converts the parallel encoded video information to a sequential format suitable for display on convential video monitors. The method of decoding the broad band video signal may be better understood by reference to FIG. 3b wherein decoding of the video signal at different scan line rates is illustrated by arrows $A_1B_2$, $A_1B_3$, and $A_1B_4$. If it is desired to recover or decode the video information at maximum available resolution, the broad band video signal is scanned between carrier frequencies $f_1$ through $f_n$ in a time interval which is equal to or lesser than $T_1$ minus $T_o$. As the spectrum of the encoded broad band video signal of FIG. 2b is scanned by an appropriate decoder device, an output signal is assembled which contains a sample or segment of the modulation information of each carrier frequency scanned so as to derive the video information pertinent to each particular pixel represented by the carrier frequency being scanned. As successive carrier frequencies are scanned, a recovered or decoded video signal is assembled such as shown in FIG. 2c, where each pixel $p_1$, $p_2$, $p_3$ ... $p_n$ is derived by sampling the modulation of the corresponding carrier frequency. While the decoded signal is shown to be a stepped wave form, practical circuit limitations would most likely cause the transition of the video signal between adjacent pixels to be relatively smooth. In addition it will be understood that the stepping is greatly exaggerated in the drawings. In a practical system constructed according to this invention, it is contemplated that each scan line would be divided into a number of pixels approaching the maximum horizontal resolution obtainable from the video signal. For example, in the case of NTSC color video signals the horizontal luminance or brightness resolution is approximately 330 pixels, while the horizontal color resolution is only about 118 pixels. Thus, in a monochrome embodiment of the invention the encoding system may be provided with means for generating and encoding approximately 330 carrier frequencies so as to preserve the full available horizontal luminance resolution. If a color signal is to be encoded, 118 additional carrier frequencies may be provided for each color signal to thus preserve the full color resolution of the NTSC signal.

Since it is contemplated that the system of this invention be used for encoding high definition television signals for subsequent decoding at lower scan line rates, the number of desirable carrier frequencies will be much higher. For example, the proposed high definition line standard of 1,125 scan lines at a bandwidth of 30 Mega Hertz may make feasible a horizontal luminance resolution of 1600 pixels. Thus, a system constructed according to this invention would desirably include 1,600 carrier frequencies in order to preserve the horizontal luminance resolution of the high definition source signal.

Color video may increase the number of necessary carrier frequencies if the color information is assigned to carrier frequencies separate from the carrier frequencies modulated with luminance information, to minimize the complexity of the modulation and decoding of the carrier frequencies. However, a lesser number of carrier frequencies is required for the color information since the color resolution is lower than the luminance resolution. For example, for the high definition system employing 1600 carrier frequencies for the luminance information, only one third as many carrier frequencies would be necessary for each of the two color signals which are transmitted with the luminance information in the source video signal. The encoding of the blue and red video information would thus each require approximately 533 additional carrier frequencies, for a total of approximately 2666 carrier frequencies. This number may be reduced by modulating each carrier with more than one video characteristic. For example, one set of carrier frequencies may be modulated with the luminance information and another set of carrier frequencies might be modulated such that each carrier frequency carries both blue and red color information. This dual modulation may be achieved by any means known to the art. For example, one color could be amplitude modulated onto a carrier frequency while the other color may be frequency or phase modulated onto the same carrier. In the alternative, two color signals may be multiplexed onto one carrier frequency. Yet other modulation schemes will be apparent without departing from the scope of the invention.

The carrier frequencies may be also modulated with depth information which may be a low resolution signal for use in reconstructing three dimensional, which images may be obtained by means presently known or means to be devised in the future. Among three dimensional video systems presently known, is the use of alternate fields providing the left eye and right eye images. The two images may be separated by means of colored or polarized glasses worn by the viewer in a manner known in the art.

Although a relatively large number of carrier frequencies is desirable for encoding a video signal according to this invention, the bandwidth of each carrier is relatively small because the video information corresponding to an individual pixel changes relatively slowly as successive scan lines are encoded. The side band spread of each carrier frequency is the product of the vertical resolution of the video image times the number of frames per second and divided by two (each cycle can represent two pixels). For example, for a format having a vertical resolution of 250 pixels and 30 frames per second the required carrier bandwidth is 3750 Hz. For the above example, if a horizontal resolution of 330 pixels is desired, i.e., 330 carrier frequencies are provided, then the overall bandwidth of the encoded broad band video signal is 1.2375 MHz, i.e. the sum of the individual bandwidths of the carrier frequencies.

Figure 3B:
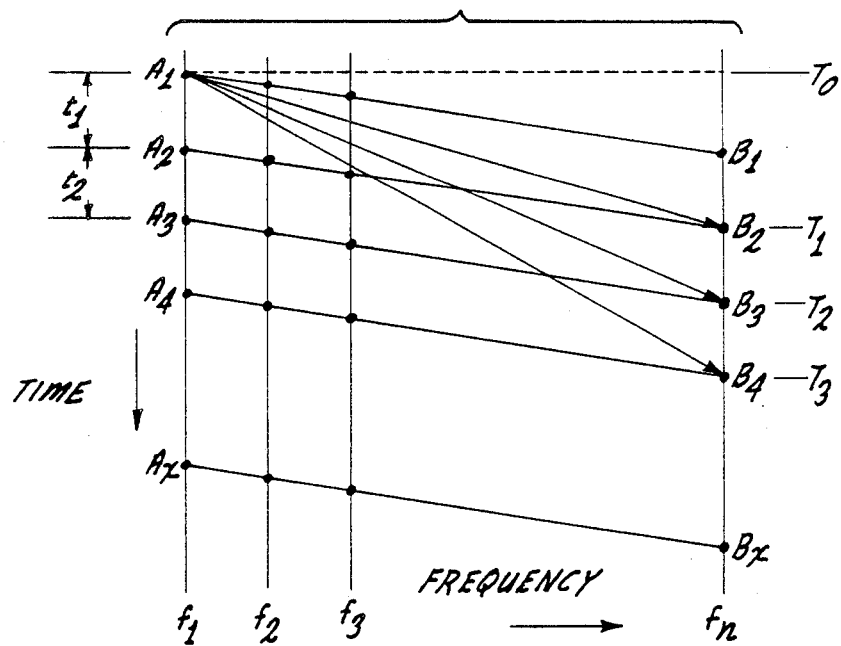
FIG. 3b illustrates alternative scanning patterns of the encoded video signal of FIG. 3a so as to vary the number of scan lines of the decoded video signal.

If the rate of scanning of the encoded video signal in FIG. 3b is slowed such that the frequencies $f_1$ through $f_n$ are scanned in a time interval greater than $T_1$ minus $T_0$ the result is that the number of scan lines of the decoded video signal is reduced from the number of scan lines present in the source video signal. For example, if the scanning is carried out along arrow $A_1B_3$ each decoder scan of the encoded video signal combines two scan lines, $A_1B_1$ and $A_2B_2$, of the encoded source video signal. As a result, the decoded video signal will have one half the number of scanned lines of the source signal. If the decoder scanning is carried out along arrow $A_1B_4$ each decoder scan combines three scan lines $A_1B_1$, $A_2B_2$ and $A_3B_3$ of the original video signal, and thus a division by three of the source signal scan line rate is achieved. Intermediate scan ratios can also be obtained by simply adjusting the rate at which the decoder scans across the encoded broad band video signal.

Whenever a reduction in the number of scan lines is achieved, for example, by scanning along arrow $A_1B_3$, the resulting scan line of the decoded signal is a combination of portions of more than one input signal scan lines. Thus, a decoder scan along arrow $A_1B_3$ results in a decoded scan line which combines the first half of the source scan line $A_1B_1$, and the second half of the source scan line $A_2B_2$.

It will be noted that the number of pixels available for decoding, as represented by the number of carrier frequencies in the encoded video spectrum, is always the same as the number first encoded from the source video signal. However, if the encoded broad band signal is scanned at a rate lesser than the scan rate of the source video signal some of the pixel video information present in the encoded signal is overlooked and lost to the decoded signal. By scanning the encoded broad band video signal the decoder device in effect rearranges the video information from the parallel format of the encoded signal to the usual serial format which may be processed by standard video monitor devices.

The encoding of video information by the method of this invention achieves significant reductions in the bandwidth required for transmission of the input video information. In part, this is a result of the fact that scan line information is transmitted in parallel continuous form for each pixel, and consequently no horizontal blanking period is transmitted, i.e. no carrier frequencies are assigned to the portions of the input video signal which carry the horizontal synchronization information. The scanning lines of the decoded signal are not inherent in the transmitted encoded signal as is the case in conventional video signals. Rather, the scan lines are produced by the decoder as it electronically scans the parallel encoded pixel information at an arbitrary rate.

The present American system of color television known as the NTSC system defines the image format as 525 scanning lines giving 350 actual lines of vertical resolution, a 4.2 Mega Hertz bandwidth giving 330 lines of horizontal resolution for luminance and approximately 118 lines (0.357 of luminance resolution) of horizontal resolution for color, a 3 to 4 aspect ratio and 30 frames per second. The present system of this invention by contrast requires a separate carrier frequency for each element or pixel of horizontal picture resolution. Thus, for a system equivalent to the NTSC image standard 330 carrier frequencies or channels would be required. The bandwidth for each carrier frequency is computed as one half the product of the vertical resolution (including the vertical blanking period) and the frame rate. This results in a carrier frequency bandwidth of 5,625 hertz for an NTSC equivalent signal. Each carrier frequency may be alotted a bandwidth of 5650 Hz for ease of separation, giving a total bandwidth of 1.9 Mega Hertz for luminance information plus 2008 Hz per carrier frequency or channel times 118 channels for a total of 0.237 Mega Hertz bandwidth for each of two colors. The total signal bandwidth required by a system according to this invention for an NTSC equivalent image is, therefore, 2.374 MegaHertz. In part, the reduction in bandwidth is a result of the greater utilization of transmission bandwidth towards actual image information and a reduction in signal bandwidth used for formating of the received image by eliminating transmission of the horizontal blanking interval. In addition, the video information modulated onto the individual carrier frequencies may be arbitrarily limited so as not to exceed the actual vertical resolution available from the source signal. This vertical resolution for an NTSC signal is only 350 lines, whereas 525 scan lines are actually transmitted. In part, these excess lines are used for the vertical blanking periods, and in part they are redundant scanning to fully cover picture elements which would otherwise fall between scan lines. The excess signal bandwidth required by this redundant scanning is inherently eliminated in the encoding process because the encoded signal is not transmitted with an arbitrary number of scan lines and the video information modulated onto each carrier frequency actually varies at a maximum rate of 350 pixels per frame rather than the 525 scan lines normally transmitted, resulting in a substantial reduction of the encoded signal bandwidth.

In an extension of the principles of this invention, a video encoding system may be implemented wherein the encoding is carried out frame-by-frame rather than line-by-line, as was described above. In such an alternate system, a carrier frequency is assigned for every picture element in an entire video frame. Thus, video information pertaining to every pixel in the entire video frame is available continuously in the signal encoded according to this invention. While the number of required carrier frequencies is substantially increased due to the greater number of pixels encoded, the bandwidth of the information modulated onto each carrier frequency is greatly diminished. Each pixel in the image needs to be sampled only at a rate above the persistence rate of the human eye, depending on the smoothness of motion desired. For a rate of 24 frames per second, a 12 Hz bandwidth allowance per carrier frequency is adequate. This 12 Hz bandwidth multiplied by 115,500 carrier frequencies gives a bandwidth of 1.386 Mega Hertz for luminance information plus 12 Hz per carrier frequency times 14,720 channels giving 0.177 Mega Hertz for each of two colors information. The total signal bandwidth required for an NTSC equivalent image is, therefore, 1.74 Mega Hertz. It can be seen from the foregoing that an increasing reduction in signal bandwidth can be achieved by this process of "diversiplexing" by which diverse elements of a single signal are transmitted in parallel form over multiple carriers or transmission lines thereby providing random access to the diversity of signals. This basic principle may be extended to any type of information transmission including audio as well as video signals and is a format for handling information as an alternative to serial or flow type processing of information.

A video signal encoded in full frame by frame format, i.e. with a carrier frequency assigned to every pixel in the video frame, can be decoded in a form compatible with any of the video signal formats in use today, regardless of scan line rates or number of frames per second.

Each encoded frame thus occupies the full width of the broadband encoder video signal, so that the usual two interlaced fields are transmitted side-by-side in parallel form. Both the vertical and horizontal blanking periods are eliminated and only image information is encoded. The full frame encoded video signal may be scanned by a decoder such as disclosed herein in a selective manner so as to reconstruct a decoded video signal having any desired scan line rate and number of frames per second. By encoding full frames it is, therefore, possible to effect frame rate conversion as well as changing the scan line rate of the decoded video signal. Each scan cycle across the encoded frequency spectrum produces a video output representative of one video frame. The number of scan lines per frame may be selected by adjusting the scanning pattern of the decoder. The decoder must also generate the necessary vertical and horizontal synchronization information and mix it with the decoded video signal.

In summary, for the line-by-line encoding of video signals the bandwidth requirement for luminance information is lowered to approximately 70 percent of present bandwidth due to elimination of the aforementioned redundant horizontal scanning sampling losses, and an additional 15 percent reduction of the above because of the elimination of horizontal blanking periods. The overall bandwidth reduction for luminance information is, therefore, approximately 60 percent of the present NTSC system. The bandwidth requirements for color information are further lowered because the information is handled in a planar rather than a linear format. Therefore, if each color signal requires approximately ⅓ the bandwidth (0.357) of the luminance information in the present system, then in the invented system the color bandwidth requirement is approximately ⅓ raised to the square, or 1/9 of the luminance bandwidth for each color. This is because in conventional video signals, the horizontal color resolution is ⅓ of luminance resolution, but vertical color resolution is still equal to the full luminance resolution. Such high color resolution is unnecessary given the low sensitivity of the human eye to color information. Thus, in encoding of the color signal according to this invention, it is possible to arbitrarily reduce the vertical color resolution relative to the vertical luminance resolution, i.e. limiting the bandwidth of the color signal modulated on each carrier frequency. This reduction may be by a factor of ⅓, so that the total color bandwidth of the encoded signal is 1/9 of the luminance bandwidth transmitted.

The parallel transmission of video information representing entire scan lines or frames allows random access to any portion of the scan line or frame without need to resort to storage devices as are presently required for analysis of video information, e.g., for noise reduction through analysis of the video signal. The random access feature of the present encoding scheme simplifies analysis and manipulation of the video information which is useful for such applications as noise reduction, image recognition, image manipulation or image prediction.

A further feature, made possible by the standards conversion method of this invention, is an adjustable panning feature which is useful due to the different aspect ratios used in the proposed high definition television standards and the present NTSC standard. The high definition standards propose a 3 to 5 or 3 to 6 aspect ratio while the present system has a 3 to 4 ratio. Thus, while the high definition signal may be converted by the present invention to a scan line number compatible with lower definition video systems, the aspect ratio will remain unchanged and the wider high definition image will not be seen in its full width on the lower definition video screen.

This problem already exists in the television industry, since more recent motion picture films have an aspect ratio similar to that proposed for the high definition television. Thus, when such wide screen motion pictures are shown on present television formats part of the film image is lost to the television viewer. Some effort is made by the television industry to correct for this loss by being selective in the portion of the film image which is included in the video signal. Thus, where an actor is standing to one side of the image, the video image may be shifted towards that side of the film image, disregarding the opposite end of the film image. Throughout a particular motion picture, various shifts of the video image may be desirable relative to the film image in order to obtain the most pleasing video rendition of the motion picture.

The conversion method of this invention makes possible relatively easy panning of the wider high definition encoded video image. Such panning may be programmed or set at the source of the high definition signal or it may be controlled at the decoder end of the system. The panning of wide screen video images is accomplished by limiting the electronic scanning of the decoder to those carrier frequencies of the broad band encoded video signal which represent the portion of the wide video image selected for viewing. Thus, the center portion of the encoded video image may be selected for viewing by scanning a select group of carrier frequencies in the middle of the encoded spectrum of carrier frequencies, disregarding the carrier frequencies at the lowest and highest ends of the encoded video spectrum. If the encoded signal includes multiple bands of carrier frequencies, then corresponding portions of each band are selected for scanning by the decoder. The portion of the encoded image selected for viewing may be shifted in any desired manner towards one side or the other of the wide screen image by disregarding different portions of the carrier frequency spectrum at the decoder end of the system. A Manual panning control may be provided at the decoder and may consist of a device or circuit which limits the range of frequencies scanned or tuned by the decoder circuit. The particular means by which such selective scanning of the encoded video spectrum is obtained will be apparent to those knowledgable in the field of video electronics.

It is also possible to splice together different portions of the encoded wide screen image. In general, the encoded image may be divided in any desired manner across its width and some portions may be removed so as to bring together previously spaced portions of the image. For example, the center portion of the encoded image may be disregarded by programming the decoder for skipping the carrier frequencies representing the centrally located pixels of each scan line of the encoded video signal, so as to obtain a decoded video signal wherein the left and right sides of the image are joined and the center has been removed. Other portions of the image may be removed by skipping the corresponding carrier frequencies during scanning of the encoded video signal by the decoder. The remaining portions of the encoded signal spectrum may be scanned and decoded in the normal manner according to this invention. It is also possible to scan portions of the encoded video signal in a random order so as to rearrange the original video image.

A further related feature is the possible anamorphic viewing of wide screen video images such as for titles and credits in motion pictures. Such viewing can be obtained by faster scanning of the entire encoded frequency spectrum so as to squeeze the wider encoded scan line into a shorter time span equal to the line scanning time of the video playback system at the decoding end.

The panning feature of the present invention also makes possible the transmission of double program features by encoding side-by-side two programs having a $3 \times 4$ aspect ratio. The combined aspect ratio of the encoded video material would thus be $3 \times 8$, the larger number being the combined width of the two images. At the decoder end, the viewer is thus given the option of selecting one or the other of the parallel running programs by making use of the panning feature. This involves selecting the lower half or the upper half of the encoded video spectrum for scanning by the decoder. It will be appreciated that such double feature transmissions can be made using a bandwidth not much greater than is presently required by conventional single program NTSC video transmissions.

An encoder system capable of producing a number of carrier frequencies sufficient to take full advantage of the horizontal resolution of high definition television signals is thus capable of encoding simultaneously, in parallel form, four separate NTSC program signals instead of a single high definition program. For even greater program thruput video information for two different programs may be encoded simultaneously by multiplexing onto the carrier frequencies. Thus, such an encoder in combination with a multiplexing system for modulating two programs on each carrier frequency would thus enable the simultaneous transmission of eight separate NTSC programs which could be made accessible through multiple decoders, each having restricted access to portions of the encoded video spectrum or through a single decoder capable of accessing any of the separate programs.

In yet further embodiments of the invention, the video images encoded according to the present method may be manipulated through the use of depth signal information and the ability to randomly access different points along each video scan line. Examples of such image manipulation include the ability to modify the angle of view between wide angle, normal or telephoto aspects of a scene. Thus, if it is desired to shift from a normal to a wide angle view, by analyzing the depth signal information objects in the forefront may be increased in size while more distant objects are reduced to provide the typical aspect of objects seen through a wide angle lens where depth of field is increased and objects near the observer are exaggerated in size relative to objects further away from the viewer. In this manner, by altering the sizes of objects according to their distance from the viewer, which distance information is provided by the depth signal, it is possible to obtain such different views. The depth information also allows the insertion of images or subjects into a scene. Given depth information it is possible to have the inserted image cover portions of the scene which are more distant from the viewer than the inserted image and likewise to allow the inserted image to be covered in part by objects in the scene which are closer to the viewer than the inserted image, thus producing realistic composite images.

The bandwidth reduction achievable through the present invention also makes possible a significant improvement in the quality of prerecorded magnetic video tapes such as VHS and Beta cassettes. This is because the full horizontal resolution of standard NTSC video signals may be recorded and played back in encoded form using a bandwidth of less than 2.5 MHz. At the present time, the quality of such tapes is degraded by the limited bandwidth capabilities of most consumer type video recorders and video cassette players. This upgrading of standard presently available video tape machines may be achieved by the addition of an inexpensive decoder to the playback system. The encoding of the recorded material would take place at some point in the chain of production and distribution of the video tapes. It will be noted that a video signal once it is encoded according to the present invention can be subsequently transmitted or recorded in the same manner as a standard video signal. The only change required is the addition of a simple inexpensive decoder for decoding the signal prior to display. Further, the decoder may be easily switched out of the video circuit so that conventional video signals may be received or recorded. The recording and viewing equipment therefore remains compatible with standard video formats.

The present invention also introduces a greater degree of flexibility in determining the image resolution resulting from limited signal bandwidth availability. In present consumer grade video recorders the limited bandwidth capability results in a marked degradation in horizontal resolution of the played back image, from approximately 330 lines in the broadcast signal to somewhere between 200 and 300 lines resolved upon playback of the recorded broadcast signal. The vertical resolution of the recorded signal, however, does not suffer a similar degradation since the number of scan lines on playback is the same as that present in the recording signal.

Since the video signal is encoded in pixel parallel format according to the present invention, it is possible to specify both the vertical and the horizontal resolutions obtainable from the encoded video signal. The maximum horizontal resolution is limited by the number of individual carrier frequencies provided in the broadband video signal. The vertical resolution may be diminished from that of the source video signal by limiting the information modulated onto each carrier frequency, thus diminishing the sideband spread for each carrier frequency, so that the carrier frequencies may be more closely spaced for a reduced overall bandwidth of the encoded video signal.

Thus, it is possible to obtain a better balanced compromise in reduced image resolution and then enhance the picture by reducing both the vertical and horizontal resolutions to obtain a given reduction in signal bandwidth, rather than necessitating a much greater reduction in horizontal resolution alone to obtain the desired bandwidth reductions.

The apparatus of the present invention includes an encoder which receives an input video signal preferably in conventional line scanning format and converts the signal to an encoded signal in pixel parallel form for transmission over a suitable link to a decoder device which receives the encoded signal and reconstructs an output video signal having a desired number of scan lines per frame. A typical video system incorporating the encoder and decoder systems of this invention is shown in block diagram in FIG. 4. The video signal source 20 may be any device capable of generating a video signal preferably in line scan format, such as a video camera, a video playback device such as a video cassette player or a video disc player of any type. The video output of the signal source 20 is converted by the encoder 22 to a pixel parallel format such as illustrated in FIG. 3a. The encoded signal output of the encoder 22 may be transmitted by any conventional transmission link. The transmission link includes any means of delivering the encoded signal to the input of the decoder 24, and may include, but is not limited to cable links, broadcast transmitter-receiver links, and magnetic or optical recording-playback systems.

The decoder 24 decodes the incoming signal from pixel parallel form to a line scan format suitable for display on a conventional monitor device 26. The monitor may be any means for displaying the decoded video signal such as CRT monitors, projection television units, as well as photographic methods of recording video images. Instead of a monitor 26 the decoder output may be connected to a recording or storage device of any type for future playback rather than immediate viewing.

An encoder system 22 for encoding a conventional video signal into pixel parallel form according to the method of this invention is shown in block diagram form in FIG. 5. It is to be understood that the systems of FIG. 5 through FIG. 14 are shown and described by way of example only and are not intended as a limitation of possible encoder or decoder constructions for practicing the method of the present invention.

Figure 6A:
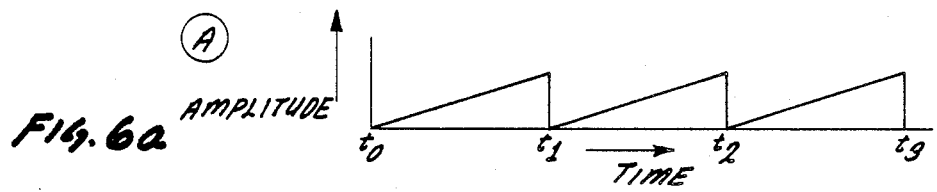
FIG. 6a shows a typical ramp waveform produced by the ramp generator of the encoder of FIG. 5.
Figure 6B:
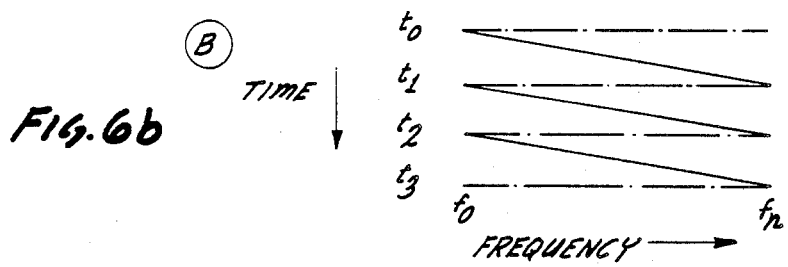
FIG. 6b illustrates a sweep frequency signal such as obtained at the output of the sweep oscillator of the encoder of FIG. 5.
Figure 6C:
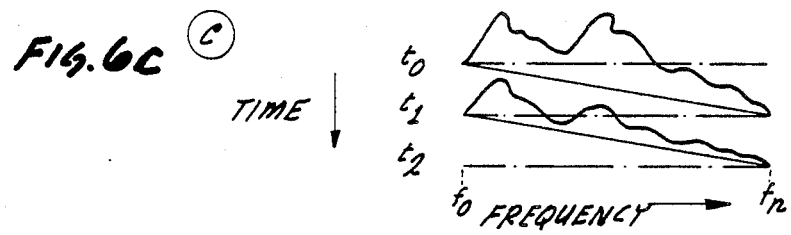
FIG. 6c is a composite diagram wherein typical video waveforms have been superimposed on the sweep frequency signal of FIG. 6b to illustrate a typical signal output of the mixer of the encoder of FIG. 5.

The video signal from the source 20 is a composite video signal in conventional line scan format and includes the video information, horizontal synchronization information as well as vertical synchronization information. A signal separator circuit 28 receives the composite video signal input and separates the horizontal synchronization information which is then used to control the timing of a ramp, staircase, or sawtooth waveform generator 30. The ramp generator 30 in turn controls the frequency output of a sweep oscillator 32. The operation of the system may be better understood by reference to the wave forms of FIGS. 6a, 6b and 6c. The ramp output A of the generator 30 is shown in FIG. 6a. This ramp waveform is connected for controlling the frequency output of the oscillator 32 to obtain a sweep frequency output such as shown in FIG. 6b. The oscillator output sweeps between a frequency $f_1$ and a frequency $f_n$. The sweep time is $t_1 - t_o$ which is equal to the ramp period in FIG. 6a. The ramp frequency in turn is synchronized by the horizontal synchronized signal A to the line scan frequency of the video signal input to the signal separator 28 in FIG. 5. The video information including the vertical synchronization information derived from signal separator 28 is modulated onto the oscillator sweep frequency output B in a mixer 34 to obtain a sweep frequency video signal such as suggested in FIG. 6c, where typical video waveforms comprising individual scan lines of the input video signal have been drawn along the sweep lines of FIG. 6b. The representation of the sweep frequency video signal C in FIG. 6c is intended as a visual aid towards facilitating the understanding of the nature of the signal but does not conform to any rigorous system of graphic representation and is therefore not to be taken literally.

The sweep frequency video signal derived from mixer 34 is fed to a bank 36 of oscillators operating in parallel. The ramp generator 30, sweep oscillator 32 and mixer 34 constitute a sequential addressing system for allocating particular scan line segments of the input video signal to each individual oscillator in the oscillator bank 36. The effect of this addressing system is to divide each scan line of the input video signal into discrete segments or pixels.

Each of the oscillators $36_a$–$36_n$ has a corresponding carrier frequency output which in combination define a broadband video carrier spectrum which preferably are the same frequencies swept by the sweep oscillator 32. The carrier frequencies $f_1, f_2 \ldots f_n$ are preferably spaced at regular intervals across the carrier frequency spectrum, the spacing being sufficient to accommodate such side bands as may be produced by modulation of the individual carrier frequencies in response to the sweep frequency video input to the oscillator bank 36.

One possible configuration for an individual oscillator subsystem $36_x$ for use in the oscillator bank 36 in FIG. 5, is illustrated in FIG. 7. Each oscillator $36_a$–$36_n$ is a subsystem $36_x$ such as shown enclosed in the dotted line rectangle and includes frequency detection or comparator circuits 38 which compare the instantaneous frequency of the sweep frequency video output of mixer 34 with the carrier frequency output $f_x$ of an oscillator 46. When the sweep video signal carrier frequency is determined by the frequency detector 38 to equal the oscillator output carrier frequency, the video information of the sweep video signal is demodulated by a detector circuit 40 and the level of the video information so detected is sampled by a sample and hold circuit 42. The output of the sample and hold circuit is representative of the video information of the sweep frequency video input at the moment when the carrier frequency of the sweep signal matches the carrier frequency output of the particular oscillator. The output of the sample and hold circuit is held fixed thereafter until the sweep cycle of the mixer output signal repeats itself and a matching condition is again detected between the sweep frequency input to the oscillator and the carrier frequency output of the oscillator 46. The output of the sample and hold circuit 42 controls the level of a modulator circuit 44 which is connected for modulating the oscillator 46. The oscillator 46 thus generates a modulated carrier frequency output $f_x$ whose modulation characteristics, e.g. amplitude modulation level, are related to the video information pertaining to a particular segment along each scan line of the video signal input to the decoder. The scan line segment is the smallest picture element or pixel resolved by the encoder 22. The video information modulated onto the carrier frequency output $f_x$ of each oscillator $36_x$ is held constant between successive repetitions of the particular pixel on successive scan lines of the video signal input to the encoder 22.

The combined carrier frequency outputs of the oscillators $36a, 36b, \ldots 36n$ of the oscillator bank 36 constitute the encoded broad band video output in pixel parallel format of the encoder 22, such as illustrated in FIGS. 2b and 3a.

Figure 8:
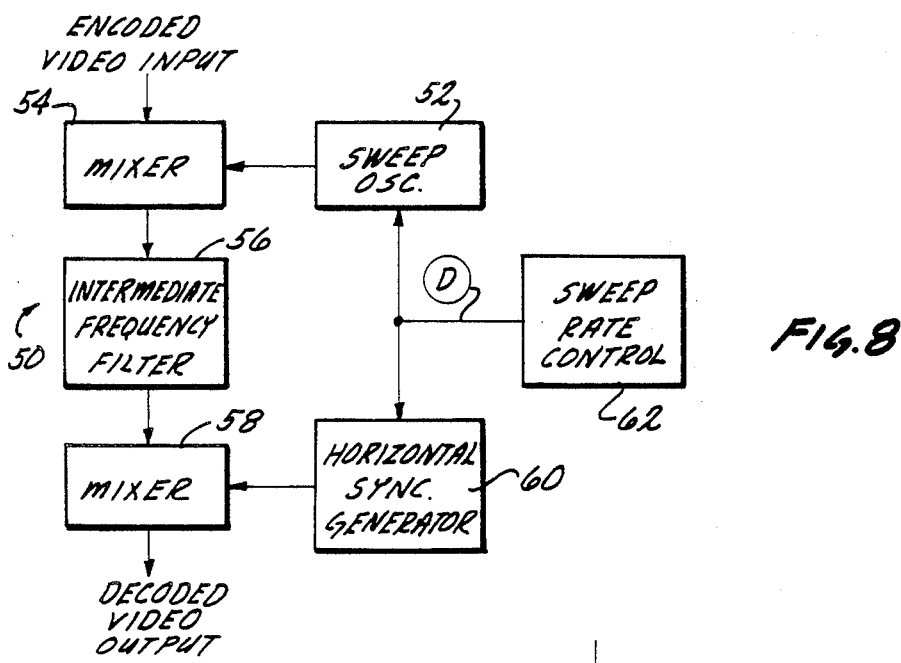
FIG. 8 is a block diagram of a decoder for decoding the output of an encoder such as that of FIG. 5.

The encoded broad band video signal may be decoded by means of a simple decoder such as illustrated in FIG. 8. In the particular, presently preferred embodiment shown the decoder 50 includes a tuner sweep oscillator 52 which has an output connected to a mixer 54. The encoded broad band video signal is received by the mixer 54 and heterodyned against the output of the sweep oscillator 52 so as to tune in a sequence each carrier frequency and to derive an intermediate frequency output which is modulated with a sequential sampling of the video information carried by each of the carrier frequencies $f_1$-$f_n$ as the decoder scans across the spectrum of the encoded broadband signal. The rate at which the encoded signal is scanned can be varied by adjustment of the sweep rate of the oscillator 52. The operation of the mixer 54 and sweep oscillator 52 can thus be seen to be similar in principle to the turner of a superheterodyne radio receiver. The intermediate frequency derived from the mixer may be passed through an intermediate frequency stage 56 which filters the mixer output to reject spurious signals generated in mixer 54. The decoded video signal obtained at this point lacks any horizontal synchronization information. A horizontal synchronization generator 60 is therefore provided, which is controlled by a sweep rate control circuit 62. The sweep rate control may be an adjustable ramp generator the output of which is used to control both the sweep rate of the sweep oscillator 52 and also the generation of the horizontal synchronization signals by generator 60. The generated horizontal synchronization signals are added to the decoded video in the mixer 58 to obtain a decoded video signal output which can be processed by conventional video equipment such as monitors and video recorders.

Figure 9:
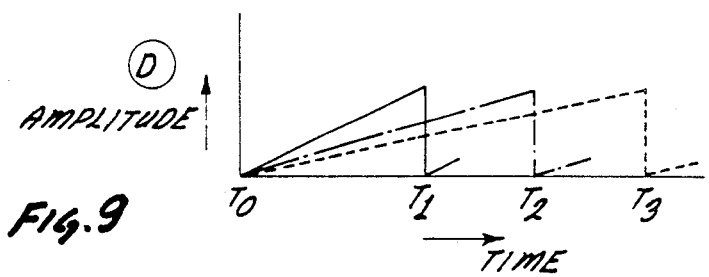
FIG. 9 shows typical ramp waveforms of different time periods such as may be generated by the sweep rate control circuit of the decoder of FIG. 8 to obtain different numbers of scan lines in the decoded video signal.

A typical variable output wave form D produced by the sweep rate control 62 is shown in FIG. 9. The ramp period controls the sweep rate of the oscillator 52. The range of frequencies swept by the oscillator may be fixed or made variable by conventional means not illustrated. In a basic decoder the frequency range swept may be fixed. However, where only a portion of the encoded broad band video signal is to be scanned, for example, to implement the above described adjustable panning feature, or where more than one program is being transmitted in parallel form on the encoded broad band signal and it is desired to select one such program at the decoder, the amplitude of the ramp output of the sweep rate control 62 is adjusted to restrict the frequency spectrum swept by oscillator 52, such that only the carrier desired portion of the encoded video signal spectrum bearing the desired program material is scanned to derive an intermediate frequency signal.

Three alternative ramp periods for the output of sweep rate control circuit 62 are shown in FIG. 9. Each ramp period results in different scan rates of the encoded video signal as best understood by reference to FIG. 3b. If the sweep rate control 62 is set to a ramp output having a period equal to $T_1 - T_o$ in FIG. 9 and FIG. 3b the sweep rate of the decoder oscillator 52 will be along the arrow $A_1B_2$ in FIG. 3b. As was earlier indicated this scan rate will result in a decoded video output having the same number as scan lines of the encoded input video signal. By adjusting the sweep rate control 62 to obtain a ramp period $T_2 - T_o$ the scan rate of the encoded video signal is shifted to correspond to arrow $A_1B_3$ in FIG. 3b. This results in a reduction by one half in the number of scan lines of the decoded video output, namely, a ratio of one output scan line to two source signal scan lines. For a ramp period $T_3 - T_o$, scanning occurs along arrow $A_1B_4$ and the number of scan lines of the decoded signal is reduced to one third.

Since the sweep rate control 62 may be made continuously adjustable any desired scan line conversion ratio may be obtained by the present invention. Where conversion to a single scan line rate is desired, the sweep rate control 62 may be limited to a single fixed ramp period.

Figure 10:
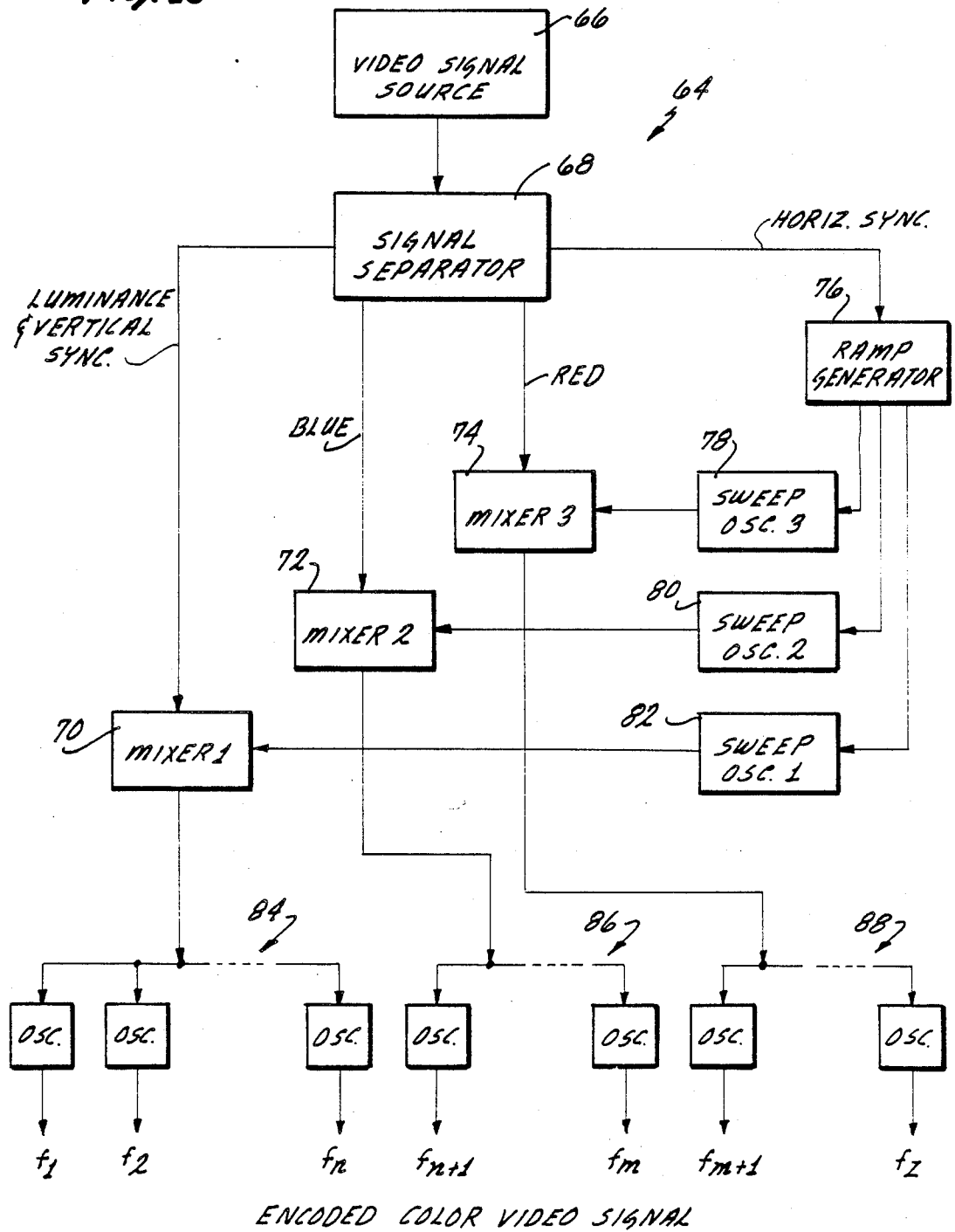
FIG. 10 is a block diagram of an encoder for encoding color video signals.

In the interest of clarity and ease of understanding the foregoing description has been in connection with the simplified encoder-decoder system illustrated in FIG. 5 and FIG. 8 suitable for conversion of monochrome video signals. An encoder suitable for encoding color video signals is shown in FIG. 10 of the drawings. The color video encoder receives a video signal in conventional line scan format from a source 66 and separates the input video signal by means of a signal separator circuit 68, such as are known in the art, into four separate output signals: the luminance and vertical synchronization signal, two color signals, e.g. a blue signal and a red signal, and a horizontal synchronization signal. The first three signals are fed to separate mixers 70, 72 and 74, respectively. The horizontal synchronization signal is utilized to synchronize a ramp generator 76 to the line scan timing of the source video signal. The ramp output of the generator 76 in turn synchronizes the sweep cycles and controls the sweep rate of sweep oscillators 78, 80 and 82. The sweep frequency output of the sweep oscillators is each connected to a corresponding one of mixers 70, 72, 74 such that each sweep frequency signal is modulated with one of the video signals separated by separator circuit 68. Thus, the output of oscillator 78 is modulated with red color information in mixer 74; the output of oscillator 80 is modulated with blud color information in mixer 72 and the output of oscillator 82 is modulated with luminance and vertical synchronization information in mixer 70. The modulated sweep frequencies resulting from the three separate mixing processes are connected to first, second and third oscillator banks 84, 86, and 88. Each oscillator bank contains a number of individual oscillators, each generating a corresponding carrier frequency output. The individual oscillators in the oscillator banks 84, 86, 88 may each be similar to the subsystem $36_x$ shown in FIG. 7 and which was described above in connection with the monochrome encoder of FIG. 5. If it is desired to limit the color signal bandwidth in order to reduce the overall bandwidth of the encoded video signal, this may be done by providing a suitable bandpass filter between the modulation level circuit 44 and oscillator 46 of each oscillator $36_x$.

The operation of each oscillator bank 84, 86, 88 in response to the modulated sweep frequency input from the corresponding mixer is analogous to the operation of the oscillator bank 36 in FIG. 5. Thus the oscillator bank 84 produces an encoded broad band video output signal spectrum which includes the carrier frequency oscillator outputs $f_1$ through $f_n$, which in this example is analogous to the encoder output of FIG. 5. In addition, two other encoded video outputs are obtained from oscillator banks 86 and 88 in response to the video modulated sweep frequency outputs of mixers 72 and 74. The output of oscillator bank 86 comprises, for example, a series of carrier frequencies $f_{n+1}$ through $f_m$ which carries the blue color information of the input video signal in encoded pixel parallel form, i.e. such that the blue color information for an entire scan line of the input video signal is available across the spectrum of the encoded blue signal output of oscillator bank 86. Oscillator bank 88 similarly produces an encoded output comprising carrier frequencies $f_m+1$ through $f_z$ which carries the red color information of the input signal in encoded pixel parallel form so as to make available the red color information for an entire scan line across the spectrum generated by the oscillator bank 88. The outputs of the three oscillator banks 84, 86 and 88 thus generate an encoded composite video signal in which the luminance, red color and blue color information for an entire scan line is encoded and available by scanning the composite spectrum output of the color video encoder. The number of individual oscillators required by the color oscillator banks 86 and 88 may be a fraction of that provided in the luminance oscillator bank 84. This follows from the lower resolution of the color information provided in conventional video signals due to the lower color resolution of the human eye compared to the eye's capability for resolving brightness information. Typically the number of carrier frequencies produced by oscillator banks 86 and 88 may each be one third of the number of carrier frequencies generated by the oscillator bank 84. Thus, for encoding a high definition television signal capable of resolving one thousand six hundred vertical lines, the composite output of the color encoder 64 may include sixteen hundred (1,600) carrier frequencies generated by oscillator bank 84, and five hundred thirty three (533) carrier frequencies generated by each of oscillator banks 86 and 88, for a total composite spectrum of two thousand six hundred sixty six (2,666) carrier frequencies.

It will be understood that the encoder may be altered in various ways by adopting different modulation schemes for encoding the color information. For example, instead of using separate oscillator banks 86 and 88, the color information could be modulated in addition to the luminance information onto selected carrier frequencies generated by oscillator bank 84. For example, the luminance and vertical synchronization information may be amplitude modulated onto carrier frequencies $f_1$ through $f_n$ while the color information could be phase modulated, frequency modulated or multiplexed onto alternate carrier frequencies of the oscillator bank 84.

The carrier frequencies from the three oscillator banks 84, 86 and 88 may be equally spaced throughout the composite encoded spectrum or if so desired clear frequency space may be allowed between the output spectrum of each pair of oscillator banks, to facilitate decoding of the composite signals.

Figure 11:
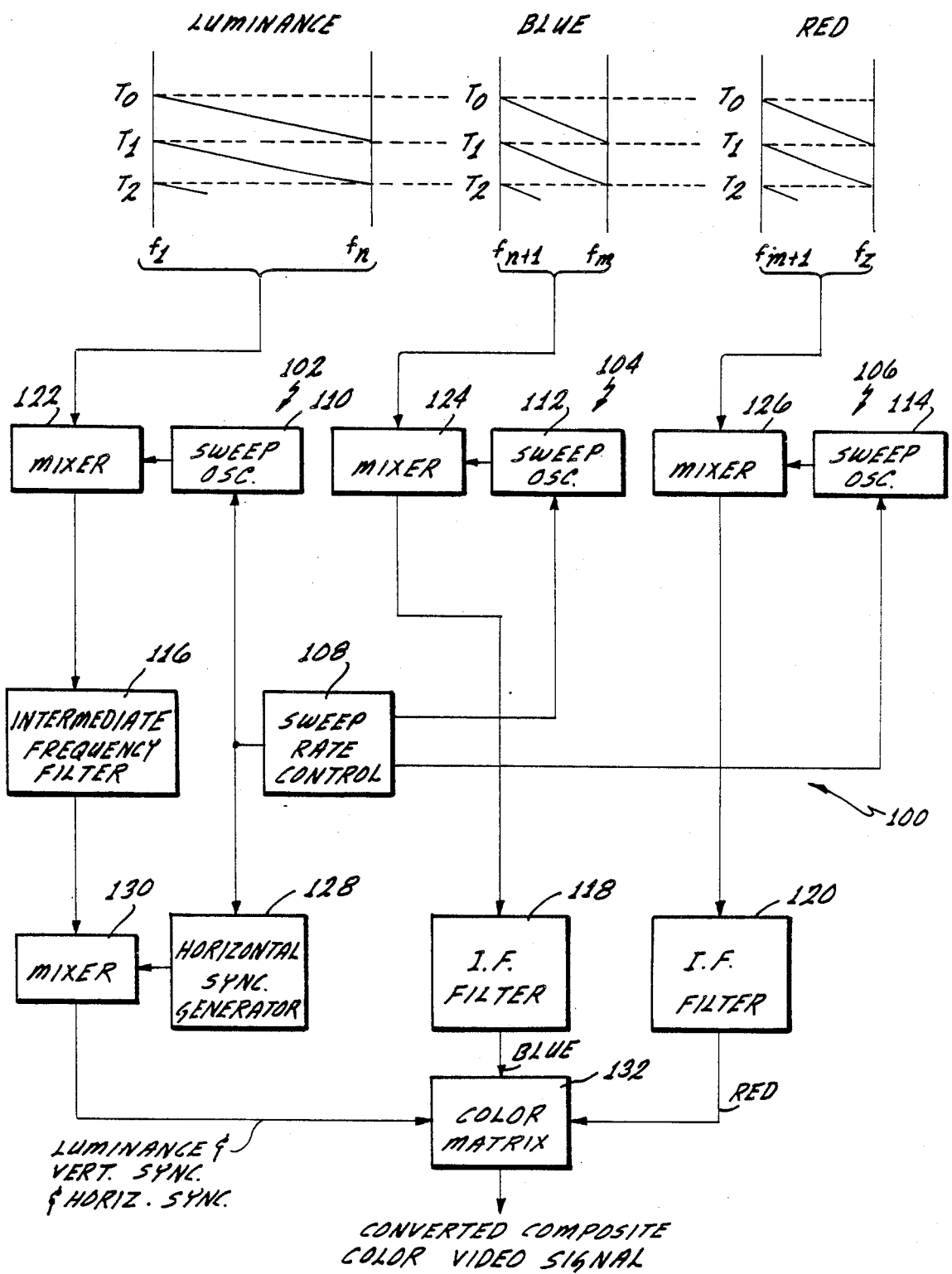
FIG. 11 is a block diagram of a decoder for decoding the output of a color video encoder such as that of FIG. 10.

A color decoder circuit for use with the color encoder of FIG. 10 is illustrated in FIG. 11 of the drawings. The decoder 100 consists of three decoder stages 102, 104 and 106 each analogous in operation to the decoder of FIG. 8. The three decoder stages operate in parallel and are synchronized by means of a common sweep rate control circuit 108. Each decoder stage receives a spectrum segment of the encoded color video signal corresponding to one of the components of the composite color video signal. Each decoder stage 102, 104, 106 heterodynes the respective spectrum segment of the encoded color video signal against the output of a sweep oscillator 110, 112, 114 respectively by means of a mixer circuit 122, 124, 126 respectively to scan the corresponding encoded spectrum segment. Thus the decoder stage 102 may be tuned, by appropriate adjustment of its sweep oscillator 110, to receive a frequency spectrum comprising the carrier frequencies lying between $f_1$ and $f_n$ which is the encoded video signal carrying the luminance information. Similarly, the decoder stages 104 and 106 by appropriate adjustment of their respective sweep oscillators 112 and 114 may be tuned to receive the frequency spectrum segments lying between carrier frequencies $f_{n+1}$ and $f_m$, and $f_{m+1}$ and $f_z$ respectively. The sweep rate of the sweep oscillators 110, 112 and 114 is synchronized by the sweep rate control 108 such that the three encoded carrier frequency spectrum segments are scanned by the three decoder stages in a synchronized manner as indicated in the signal diagrams at the top of FIG. 11. Each spectrum segment is scanned by the corresponding decoder stage such that the scan of each spectrum segment begins and ends simultaneously, e.g., between times $T_o$ and $T_1$. Since the spectrum segments corresponding to the blue and red information may each contain fewer carrier frequencies than the luminance spectrum segment, the scanning of these two segments is accomplished at a slower rate which is consistent with a lower resolution of the color information as compared to the resolution of luminance information.

Each decoder stage 102, 104 and 106 may include intermediate frequency stages 116, 118 and 120 respectively, for rejecting spurious signals produced by the respective mixers 122, 124 and 126 and passing the desired intermediate frequency signals. One of the decoder stages e.g. stage 102 may be further provided with a horizontal synchronizaton generator 128 controlled by the sweep rate control 108 for producing horizontal synchronizaton information which is then added to the decoded signal by means of a mixer 130. The outputs of the three decoder stages 102, 104 and 106 may be combined by means of a color matrix circuit 132 such as is known in the art, e.g. for combining the color information in conventional color video cameras, to thus obtain a composite color video output which has been converted to a desired line scan rate.

The ramp generator of the rate control circuits for controlling the sweep oscillators of the decoders in FIGS. 8 and 11 may be replaced by staircase waveform generators, such that the output frequency of the sweep oscillators changes in discrete steps and remains fixed during a brief interval. Means should be provided, however for ensuring that the stepping of the oscillator output is in alignment with the carrier frequency spacing across the encoded signal spectrum, so that the stops of the sweep signal coincide with the carrier frequencies. A similar substitution could be made for the ramp generators in the encoders in FIGS. 5 and 10.

As has been described, a reduction in the minimum band width necessary for the transmission of a given video signal is readily achieved by the encoding system of this invention. However, because of the parallel encoding of video information comprising each entire scan line of the input signal it is possible to achieve a further reduction in bandwidth by analyzing the video information comprising each scan line and compressing the information transmitted by eliminating redundant information. The remaining, reduced video information then requires a smaller number of carrier frequencies for transmission in encoded form according to this invention. The reduced video information may be assigned to particular carrier frequencies in the oscillator bank output either in a sequential or a non-sequential manner. In the sequential format image elements are assigned to carrier frequencies in the order in which the reduced video information is derived along the scan line, such that changes in video corresponding to a single image element information on a successive scan line calls for a reassignment of carrier frequencies for all image elements lying to the right of the changed element along the scan line. In the alternative non-sequential format, the carrier frequency assignments may remain constant for video image elements which do not change.

Figure 12:
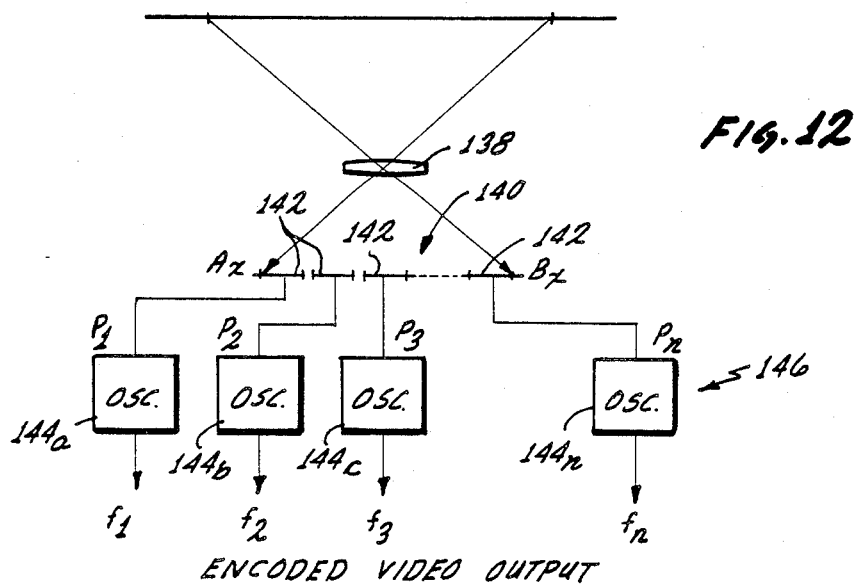
FIG. 12 is a block diagram showing a video camera and simplified encoder for deriving an encoded video signal.
Figure 13:
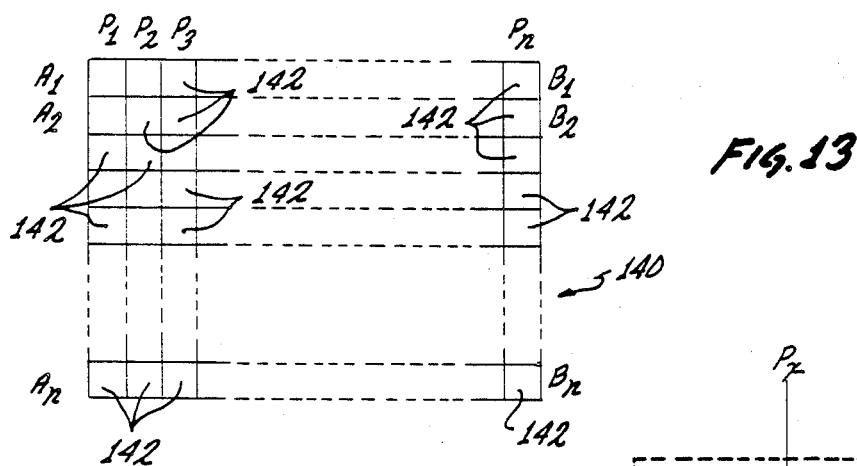
FIG. 13 illustrates a matrix arrangement of the photosensor elements of the camera in FIG. 12.
Figure 14:
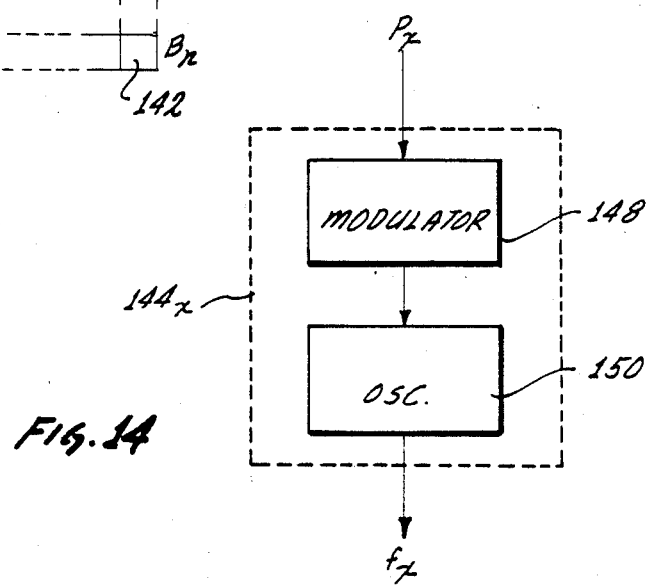
FIG. 14 is a block diagram of a simplified oscillator subsystem for the encoder of FIG. 12.

In an alternate embodiment of the invention illustrated in FIGS. 12-14, the input video signal to the encoder may be derived from a modified camera, particularly adapted for use with the converter system of the present invention. In typical presently used video cameras, an image is projected by a lens onto a sensor surface which is scanned so as to derive a video output which is representative of point-to-point variations in the image brightness and color along a repeating scanning pattern. The resulting video output is in a sequential format for the entire scanned image and thus requires processing in order to be encoded in pixel parallel form according to the present invention. This processing is carried out by the input circuits of the encoders described above and shown in FIGS. 5 and 10. Specifically the input video signal in the usual pixel sequential form, is processed by the signal separator 28, ramp generator 30, sweep oscillator 32 and mixer 34 of the encoder of FIG. 5. A similar processing sequence takes place in the encoder of FIG. 10 for the separate luminance and color signals. The signal obtained at the output of mixer 34 in the encoder of FIG. 5 is in pixel parallel, line sequential form, so that all elements pertaining to each scan line may be modulated in parallel form onto the carrier frequencies $f_1$ through $f_n$.

This processing of the input video signal may be eliminated by deriving the input signal in pixel parallel, scan line sequential form at the camera as shown in FIG. 12. An image is projected by a lens 138 onto a photosensor surface 140 provided with individual photosensors 142 for each pixel of each scan line of the video output. A suitable photosensor array 140 may be constructed by any suitable process such that a number of discrete simultaneous video signals may be derived in parallel from the photosensor elements 142 constituting each scan line of the sensor array. As shown in FIG. 13, the photosensors 142 may be arranged in rows and columns so as to define a two dimensional matrix, each row $A_xB_x$, for example, constituting one scan line of the video frame. The video outputs $P_1$ through $P_n$ of the individual photosensors 142 in each row $A_xB_x$ of the sensor array may be connected directly to a corresponding oscillator $144a$ through $144n$ in an oscillator bank 146. An appropriate switching circuit may be provided for sequentially connecting the video outputs $P_1$ through $P_n$ of successive sensor rows $A_1B_1$ through $A_nB_n$ to the corresponding oscillators. The switching from row to row should be at a rate equal to the desired scan line rate of the video signal to be encoded. The camera output is thus in pixel parallel form for pixels $p_1$ through $p_n$ constituting the elements of each scan line $A_xB_x$, and the camera output thus includes sequential scan lines $A_1B_1$, $A_2B_2$, ... $A_nB_n$. If an individual oscillator is provided for each photosensor element then the camera output may be in pixel parallel form for each entire video frame, with a carrier frequency for each pixel.

As shown in FIG. 14 the complexity of the individual oscillators $144x$ may be simplified from the subsystem shown in FIG. 7. Since in the alternate embodiment, the video input to each oscillator $144x$ is derived directly from a corresponding photosensor 142, rather than from a video modulated sweep signal, the frequency detector circuit 38 is unnecessary. Further, the modulation level detector 40 and the sample and hold circuit 42 may also be eliminated. As shown in FIG. 14, the output $P_x$ of each pixel photosensor 142 may then be connected directly to a suitable modulation circuit 148 for continuously modulating the carrier frequency output $f_x$ of an oscillator 150. It will be appreciated that the complexity of the encoder is considerably reduced in this alternate embodiment. Although the number of oscillators required for a particular degree of image resolution remains the same, the complexity of each oscillator $144_x$ is greatly reduced and the aforementioned input stages of the encoder are likewise eliminated.

Further variations of the alternate embodiment of FIG. 12 are possible. In the embodiment illustrated in FIG. 12 the photosensor elements 142 and the oscillator circuits $144_x$ may be physically separate from each other. In the alternative, instead of connecting the photosensor outputs to the oscillators, the oscillator outputs $f_1$ through $f_n$ may be fed to a corresponding column of suitably adapted photosensors 142 on the sensor array 140, such that the modulation of each carrier frequency $f_x$ takes place on the photosensor elements 142 in the sensor matrix, and the output of each pixel photosensor element is the modulated carrier frequency, and the combined output of the optosensor matrix is the encoded video signal. The camera output is derived in the aforedescribed row by row sequence.

In yet another variation of the embodiment of FIG. 12 a camera may be constructed wherein the pixel photosensor elements 142 of the sensor array 140 are individual light sensitive oscillators. Thus, each pixel photosensor is an individual oscillator tuned for generating a particular carrier frequency and which is modulated in accordance to the characteristics of the light falling upon the portion of the sensor matrix at which the particular oscillator is located. Thus, for example, each pixel photosensor may include a light dependent resistive element connected for modulating the amplitude of the oscillator output in response to variations in the intensity of light falling upon the particular photosensor location within the sensor matrix. Other variations which will be obvious to those skilled in the art are possible, such as light sensitive capacitors for varying the frequency of each oscillator to thereby obtain a frequency modulated carrier for each pixel or scan line element. For color video, an encoded color video signal may be obtained by use of multiple photosensor elements for each scan line element or pixel, for example, three oscillators sensitive to luminance, blue, and red respectively.

The encoded video signal produced by the embodiment of FIGS. 12 through 14 and variations thereof is fully compatible with the decoder systems described above.

It must be understood that many alterations and modifications may be made by those having ordinary skill in the art to both the method and apparatus of the present invention without departing from the spirit and scope of the invention. Therefore, the presently illustrated embodiments have been shown only by way of example and for the purposes of clarity and should not be taken to limit the scope of the following claims.

I claim:

1. A method for converting an input video signal having a first scan line rate to an output video signal having a second scan line rate, said method comprising the steps of:

generating a plurality of carrier frequencies, each carrier-frequency being associated with at least one scan line segment of said input video signal;

modulating each of said carrier frequencies with video information corresponding to said least one scan line segment of said input video signal;

holding substantially constant the modulation of each said carrier frequency between successive scan lines of said input video signal;

sampling at least some of said carrier frequencies in a sequence so as to derive a video output signal modulated with a sequence of carrier frequency modulation samples, said video output signal derived for each sampling sequence representing one decoded scan line;

repeating said sampling sequence at a rate related to the desired scan line rate of the output video signal.

2. The method of claim 1 wherein said plurality of carrier frequencies are evenly spaced across a broadband video carrier spectrum.

3. The method of claim 1 wherein the number of carrier frequencies generated is substantially equal to or less than the horizontal resolution of said input signal.

4. The method of claim 1 further comprising the steps of generating a horizontal synchronization signal related to said rate of repetition of said sampling sequence and mixing said horizontal synchronization signal with said output video signal.

5. The method of claim 1 or claim 4 further comprising the step of synchronizing said scanning sequence to the horizontal synchronization information of said input video signal.

6. The method of claim 5 wherein said step of synchronizing comprises the step of deriving a signal representative of horizontal synchronization information present in said input video signal.

7. The method of claim 1 wherein said step of modulating comprises the step of generating a sweep frequency signal sweeping said carrier frequencies, modulating said sweep frequency signal with said video input signal such that each scan line of said video input signal corresponds to one sweep cycle of said sweep frequency signal, detecting a particular relationship between the instantaneous frequency of said video modulated sweep frequency signal and each of said carrier frequencies, and modulating each of said carrier frequencies with video information related to the modulation of said sweep frequency signal at the time that said particular relationship is detected such that video information corresponding to each scan line element of the input video signal is encoded in parallel form on said carrier frequencies.

8. The method of claim 7 further comprising the step of holding substantially constant the modulation of each of said carrier frequencies between successive sweep cycles of said video modulated sweep signal.

9. The method of claim 1 or claim 7 wherein said modulating step comprises the step of modulating one or more of the amplitude, frequency and phase of each of said carrier frequencies.

10. The method of claim 1 or claim 7 wherein said modulating step comprises the step of multiplexing said information onto said carrier frequencies.

11. The method of claim 1 wherein said step of sampling comprises the steps of heterodyning said carrier frequencies with a sweep frequency signal to derive a video modulated intermediate frequency signal, said intermediate frequency signal being modulated with video information derived in sequential manner from each of the heterodyned carrier frequencies, said sequential video information derived for each sweep cycle of said sweep frequency signal being representative of one scan line of the output video signal.

12. The method of claim 11 wherein said sampling step comprises the step of repeating the sweep cycle of said sweep frequency signal at a rate equal to the desired scan line rate of the output video signal.

13. The method of claim 11 or claim 12 further comprising the steps of generating horizontal synchronization information related to said sweep frequency signal and mixing said horizontal synchronization information with said output video signal.

14. The method of claim 13 further comprising the step of generating a rate control signal for controlling the sweep rate of said sweep frequency signal and said horizontal synchronization information.

15. The method of claim 1 wherein the input video signal includes luminance and color information and said method further comprises the step of deriving separate color and luminance signals from said input video signal prior to said modulating step.

16. The method of claim 15 wherein each of said color and luminance signals is modulated onto a separate set of carrier frequencies.

17. The method of claim 16 wherein said step of modulating comprises the step of generating a sweep frequency signal for each of said color and luminance signals each said sweep frequency signal respectively sweeping a corresponding one of said separate carrier frequency sets;

modulating each of said sweep frequency signals with a corresponding one of said color and luminance signals such that each scan line of said color and luminance signals corresponds to one sweep cycle of the corresponding sweep frequency signal, detecting a particular relationship between the instantaneous frequency of each said modulated sweep frequency signal and each carrier frequency of the said corresponding separate carrier frequency set, and modulating each of said carrier frequencies with information related to the modulation of said sweep frequency signal at the time that said particular relationship is detected, such that color and luminance information corresponding to each scan line segment of the input video signal is encoded in parallel form on said separate carrier frequencies.

18. The method of claim 15 wherein portions of said separate color and luminance signals corresponding to each scan line segment are modulated simultaneously onto corresponding one of said carrier frequencies.

19. The method of claim 15 wherein portions of at least two of said separate color and luminance signals corresponding to each scan line segment are multiplexed onto said carrier frequencies.

20. The method of claim 17 further comprising the step of holding substantially constant the modulation of each of said carrier frequencies between successive sweep cycles of each of said sweep frequency signals.

21. The method of claim 17 or 20 wherein the sweep cycles of said sweep frequency signals are synchronized.

22. The method of claim 21 further comprising the step of synchronizing said sweep frequency signals to the horizontal synchronization information of said input video signal.

23. The method of claim 7 further comprising the step of synchronizing said sweep frequency signal to the horizontal synchronization information of said input video signal.

24. The method of claim 17 wherein said step of sampling comprises the steps of heterodyning at least some of said carrier frequencies of each said carrier frequency set with a separate sweep frequency signal associated with each said set to derive separate intermediate frequency signals modulated respectively with luminance and color information sequentially assembled from the heterodyned carrier frequencies, and mixing the separate intermediate frequency signals to obtain a composite color video output signal, the sequential information assembled during each sweep cycle of said sweep frequency signals being representative of one output scan line.

25. The method of claim 24 further comprising the step of repeating the sweep cycle of each of said sweep frequency signals at a rate equal to the desired output video signal scan line rate.

26. The method of claim 24 or 25 wherein the sweep cycles of said separate sweep frequency signals are synchronized.

27. The method of claim 24 further comprising the steps of generating a horizontal synchronization signal, synchronizing said separate sweep frequency signals to said horizontal synchronization signal, and adding said horizontal synchronization signal to said composite color video output signal.

28. The method of claim 1 further comprising the step of arbitrarily limiting the bandwidth of said video information modulated onto each said carrier frequency to thereby reduce the combined bandwidth of said modulated carrier frequencies.

29. The method of claim 1 further comprising the step of arbitrarily limiting the bandwidth of color information modulated onto said carrier frequencies relative to the bandwidth of luminance information modulated onto said carrier frequencies.

30. The method of claim 1 further comprising the step of limiting said sampling to a selected group of carrier frequencies to thereby obtain an aspect ratio of the output video signal different from the aspect ratio of the input video signal.

31. Apparatus for converting an input video signal having a first scan line rate to an output video signal having a second scan line rate comprising:

means for generating a plurality of carrier frequencies;

means for modulating each said carrier frequency with video information related to one or more corresponding scan line segments of said video input signal such that the segments constituting each scan line of said input signal are carried in parallel by said carrier frequencies;

means for holding substantially constant the modulation of each said carrier frequency between successive scan lines of said input video signal; and means for sampling at least some of said carrier frequencies in a repeating sequence, each said sampling sequence driving an output video signal modulated with a sequence of carrier-frequency modulation samples, said video output signal derived for each said sampling sequence representing one decoded scan line, the scan line rate of the decoded signal being related to the rate of repetition of said sampling sequence.

32. The apparatus of claim 31 further comprising means for adjusting the rate of repetition of said scanning sequence to thereby vary the scan line rate of the video output signal.

33. The apparatus of claim 31 wherein said means for generating comprises a plurality of oscillators,
and said means for modulating also comprises means for dividing each scan line of said video input signal into a plurality of scan line segments; and
means for associating each of said oscillators with at least one of said scan line segments.

34. The apparatus of claim 31 further comprising means for generating a horizontal synchronization signal and means for mixing said horizontal synchronization signal with said output video signal.

35. The apparatus of claim 31 wherein said means for sampling comprise tuner means tunable for selecting one or more of said carrier frequency means;
connected to said tuner means for selecting a sequence of said carrier frequencies; and
means for varying the tuning of said tuner means for selecting a sequence of said carrier frequencies.

36. The apparatus of claim 31 wherein said means for sampling comprise sweep oscillator means and mixer means for heterodying said carrier frequencies with the output of said sweep oscillator means.

37. The apparatus of claim 36 further comprising means for controlling the sweep rate of said sweep oscillator means to thereby vary the scan line rate of said output video signal.

38. The apparatus of claim 31 further comprising video camera means having photosensor array means including a plurality of photosensor elements arranged in rows and columns in a two dimensional matrix, each said photosensor element providing a separate video output in response to an image projected onto said sensor array each of said video outputs for each said row being connected simultaneously for modulating a corresponding one or more of said carrier frequencies; and
means for modulating said carrier frequencies with the video outputs of successive rows of said photosensor matrix, the combined video outputs of each row representing successive scan lines of the camera video output.

39. The apparatus of claim 31 wherein said means for sampling comprises;
first means tunable for sampling one of said carrier frequency at a time; and
control means for sequentially tuning said first means to at least some of said carrier frequencies.

40. The apparatus of claim 35 wherein said tunable means comprise sweep oscillator means and mixer means for heterodyning said carrier frequencies with the output of said sweep oscillator means.

41. The apparatus of claim 39 wherein said control means are adjustable for varying the sweep rate of said sweep oscillator means to thereby vary the scan line rate of said output video signal.

42. Apparatus for encoding an input video signal having a first scan line rate into a format suitable for decoding at a second scan line rate, comprising:
means for generating a plurality of carrier frequencies;
means for modulating each said carrier frequency with video information relaated to one or more corresponding scan line segments of said video input signal such that the segments constituting each scan line of said input signal are carried in parallel by said carrier frequencies; and
means for holding substantially constant the modulation of each said carrier frequency between successive scan lines of said input video signal.

43. The apparatus of claim 42 wherein said means for generating comprises a plurality of oscillators;
and said means for modulating also comprises means for dividing each scan line of said video input signal into a plurality of scan line segments; and
means for associating each of said oscillators with at least one of said scan line segments.

44. Apparatus for decoding a video signal encoded by modulating each of a plurality of carrier frequencies with video information corresponding to one or more segments of an input video signal, comprising:
means for sampling at least some of said carrier frequencies in a repeating sequence, said means for sampling comprising sweep oscillator means and mixer means for heterodyning said carrier frequencies with the output of said sweep oscillator means, each said sampling sequence deriving an output video signal modulated with a sequence of carrier-frequency modulation samples, said video output signal derived for each said sampling sequence representing one decoded scan line, the decoded video signal having a scan line rate related to the rate of repetition of said sampling sequence.

45. The apparatus of claim 44 further comprising means for adjusting the rate of repetition of said sampling sequence to thereby vary the scan line rate of the video output signal.

46. The apparatus of claim 44 further comprising means for generating a horizontal synchronization signal and means for mixing said horizontal synchronization signal with said output 47. The apparatus of claim 46 further comprising means for controlling the sweep rate of said sweep oscillator means to thereby vary the scan line rate of said output video signal.

48. The apparatus of claim 44 wherein said means for sampling comprises:
first means tunable for sampling one of said carrier frequencies at a time; and
control means for sequentially tuning said first means to at least some of said carrier frequencies.

49. The apparatus of claim 48 wherein said tunable first means comprise sweep oscillator means and mixer means for heterodyning said carrier frequencies with the output of said sweep oscillator means.

50. The apparatus of claim 48 or claim 49 wherein said control means are adjustable for varying the sweep rate of said sweep oscillator means to thereby vary the scan line rate of said output video signal.

51. A method for encoding an input video signal having a first scan line rate into a format suitable for decoding at a second line scan rate said method comprising the steps of:
generating a plurality of carrier frequencies, each carrier frequency being associated with at least one scan line segment of said input video signal; and
modulating each of said carrier frequencies with video information corresponding to said least one scan line segment of said input video signal; and
holding substantially constant the modulation of each said carrier frequency between successive scan lines of said input video signal.

52. A method for converting an input video signal having a first frame rate to an output video signal having a second frame rate said method comprising:
generating a plurality of carrier frequencies;
dividing each frame of said input video signal into a finite number of picture elements;
modulating each said carrier frequency with video information corresponding to at least one of said picture elements;
sampling at least some of said carrier frequencies in a sequence to derive an output video signal modulated by a sequence of carrier-frequency modulation samples, each sample representing one picture element and each sampling sequence deriving an output video signal representing one video frame; and
repeating said sampling sequence at a rate related to the desired frame rate of said output video signal.

* * * * *